Figure 1:
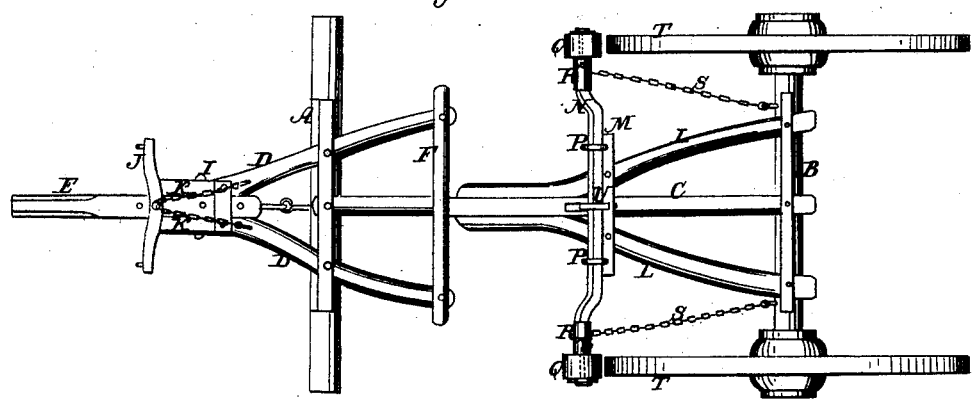

M. K. LEWIS.
CARRIAGE BRAKE.

No. 34,892. Patented Apr. 8, 1862.

Witnesses:

Inventor;
M. K. Lewis
By his Atty
J. Dennis Jr.

UNITED STATES PATENT OFFICE.

MILES K. LEWIS, OF IOWA CITY, IOWA.

IMPROVEMENT IN CARRIAGE-BRAKES.

Specification forming part of Letters Patent No. 34,892, dated April 8, 1862.

*To all whom it may concern:*

Be it known that I, MILES K. LEWIS, of Iowa City, in the county of Johnson and State of Iowa, have invented certain new and useful Improvements in Carriage-Brakes; and I do hereby declare that the same are described and represented in the following specification and accompanying drawings.

The nature of my invention and improvements in carriage-brakes consists in making the brake-block which acts on the carriage-wheel to turn or rotate on the brake-bar and wind a chain which is fastened to the brake-block and to some part of the carriage, so as to draw the brake-block against the wheel as the chain is wound; also, in a combination of devices by which the team, in holding back, applies the brake to the wheels.

To enable others skilled in the art to make and use my improvements, I will proceed to describe their construction and operation, referring to the above-mentioned drawings, in which the same letters indicate like parts in each of the figures.

In the drawings, A is the fore and B the hind axle, connected by the perch C, as shown in the drawings.

D D are hounds fastened to the axle A to support the pole E and bar F, which bar F has a long slot in it to work on the perch C.

Figure 2:
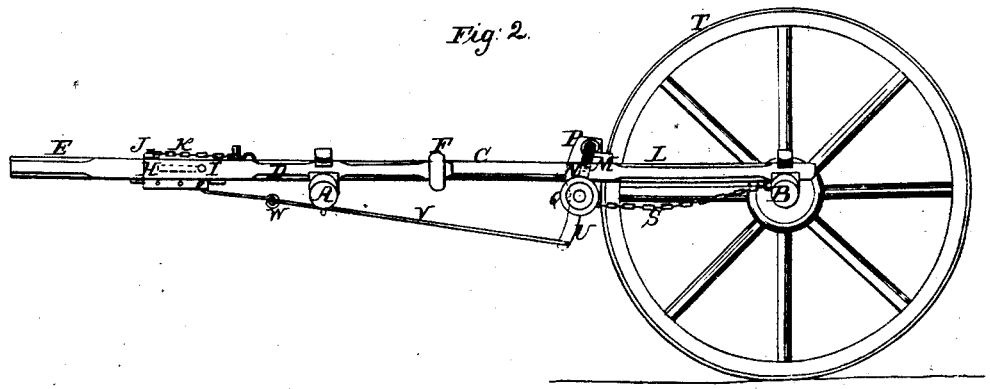

E is the pole fitted between the hounds D D, and provided with a slot H, (shown by dotted lines in Fig. 2,) through which slot the pin I passes, that connects the pole to the hounds, the slot H allowing the pole to be pushed back and drawn forward by the team which draws the carriage.

J is the doubletree, fastened to the pole by a bolt. The upper end of this bolt is fastened or connected to the hounds by the chains K K, as shown in Fig. 1.

The perch C is braced by the hounds L L, fastened to it and to the axle B. The cross-bar M is fastened to the hounds L L to support the brake-bar N, which is made in the form shown in the drawings and arranged to rock freely on the bar M in the staples P P, which fasten it to the bar M, as shown in Fig. 1. The ends of the brake-bar N are rounded, and the rotating brake-blocks Q Q are fitted to turn freely on them. These brake-blocks have hubs R R, and the chains S S are fastened to the axle B and to the brake-blocks Q Q, so that when the brake-blocks are brought against the wheels T T the friction of the rotating wheels turns the brake-blocks and winds the chains S S around the hubs of the brake-blocks and draws the brakes and blocks against the wheels until the chains are wound so tight as to stop the brake-blocks from turning when the tendency of the wheels is to turn the blocks farther and draw the chains tighter, so that the harder the brake is pressed against the wheels the greater the power exerted by the chains to draw the brakes against the wheels, thus making the brake-blocks self-acting to a great extent after they are applied until they are removed from the wheels.

The lever U is fastened to the brake shaft or bar N, and connected by the rod V to the pole E, so that when the team holds back by the pole the rod and lever applies the brakes to the wheels, and when the team pulls forward it releases the brakes from the wheels, the slot H in the tongue or pole permitting it to traverse between the hounds for the purpose of working the brake. The rod V passes through a staple in the under side of the axle A, and the rod is jointed at W, so as to allow the pole to vibrate horizontally and perpendicularly without deranging the rod.

I believe I have described the improvements in carriage-brakes which I have invented, so as to enable any person skilled in the art to make and use them. I will now state what I desire to secure by Letters Patent.

I do not claim a roller or friction-wheels to draw a separate brake against the wheels, as shown and described in J. E. Kelley's application.

I claim—

Making the brake-blocks which act on the carriage-wheels to turn or rotate on the brake-bar and wind chains which are fastened to the brake-blocks and to some part of the carriage, so as to wind the chains around the hub of the brake-block and draw the brake-blocks against the wheels, as described, and, in combination with the above-claimed devices, connecting the brake-bar to the pole, substantially as described, so as to operate or apply and release the brake by the team.

MILES K. LEWIS.

Witnesses:
 H. C. MILLER,
 O. J. O'KEEN.